(12) United States Patent
Hirata et al.

(10) Patent No.: US 6,590,360 B2
(45) Date of Patent: Jul. 8, 2003

(54) CONTROL DEVICE FOR PERMANENT MAGNET MOTOR SERVING AS BOTH ENGINE STARTER AND GENERATOR IN MOTOR VEHICLE

(75) Inventors: Masami Hirata, Kawasaki (JP); Tsuyoshi Shinohara, Yokohama (JP); Kyouichi Okada, Yokohama (JP); Isao Kishimoto, Yokohama (JP); Kazuo Nagatake, Machida (JP)

(73) Assignee: Kabushiki Kaisha Toshiba, Kanagawa (JP)

( * ) Notice: Subject to any disclaimer, the term of this patent is extended or adjusted under 35 U.S.C. 154(b) by 0 days.

(21) Appl. No.: 09/819,931

(22) Filed: Mar. 29, 2001

(65) Prior Publication Data

US 2001/0026141 A1 Oct. 4, 2001

(30) Foreign Application Priority Data

Mar. 29, 2000 (JP) ........................................ 2000-091090

(51) Int. Cl.[7] ................................................ H02P 1/24
(52) U.S. Cl. ...................... 318/727; 318/745; 318/778; 318/801; 318/811; 318/151
(58) Field of Search ........................ 318/139, 151–154, 318/254, 727, 745, 778, 801, 802, 808, 811

(56) References Cited

U.S. PATENT DOCUMENTS 4,024,444 A * 5/1977 Dewan et al. ............... 318/805
4,879,502 A * 11/1989 Endo et al. .................. 318/808
5,175,439 A * 12/1992 Harer et al. ................ 307/10.1
6,060,859 A * 5/2000 Jonokuchi ................... 318/801
6,365,983 B1 * 4/2002 Masberg et al. .......... 290/40 C
6,367,273 B2 * 4/2002 Takagi et al. ............... 318/802

* cited by examiner

Primary Examiner—Marlon T. Fletcher
(74) Attorney, Agent, or Firm—Pillsbury Winthrop LLP Intellectual Property Group

(57) ABSTRACT

A control device for a permanent magnet motor serving as both a starter for an engine and a generator in a motor vehicle is disclosed. The control device includes a drive circuit converting a direct current to an alternating current to supply the alternating current to the permanent magnet motor, the drive circuit having at least one arm including two series connected first switching elements having flywheel diodes respectively, the drive circuit having an input terminal connected to a capacitor and an output terminal connected to the permanent magnet motor, a chopper circuit including a plurality of series connected second switching elements having diodes connected in parallel with the second switching elements respectively, the chopper circuit being disposed at the battery side and connected in parallel with the capacitor, a reactor connected between a neutral point of the chopper circuit and the battery, and a control for controlling the switching elements of the drive circuit and chopper circuit so that the switching elements are turned on and off.

10 Claims, 5 Drawing Sheets

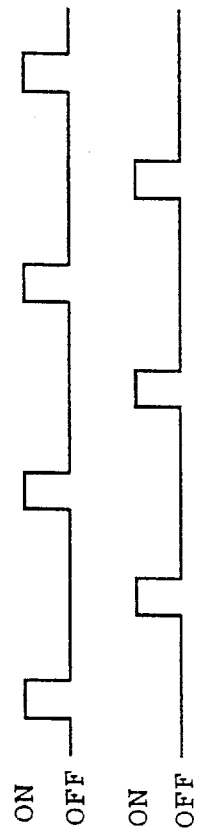
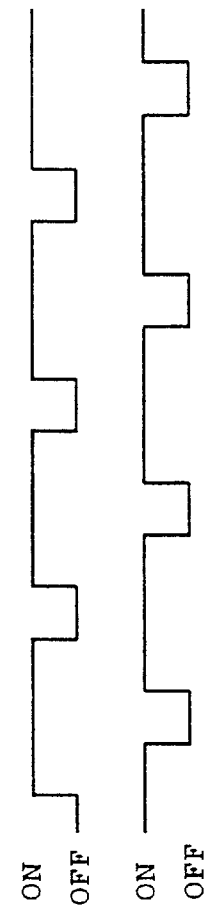
FIG. 4A
FIG. 4B
FIG. 5A
FIG. 5B

CONTROL DEVICE FOR PERMANENT MAGNET MOTOR SERVING AS BOTH ENGINE STARTER AND GENERATOR IN MOTOR VEHICLE

BACKGROUND OF THE INVENTION

1. Field of the Invention

This invention relates to a control device for controlling a permanent magnet motor serving as both an engine starter and a generator in motor vehicles.

2. Description of the Related Art

A starter (self-starting motor) is usually coupled via a clutch with an output shaft of an engine in motor vehicles such as automobiles. The starter is electrically connected via a relay switch to a battery. A dynamoelectric generator is connected via pulleys and belts to the output shaft of the engine. The generator is further connected to the battery. When an ignition key is turned so as to assume a starter position so that a starter relay is operated, a relay switch is turned on so that power is supplied from the battery to the starter. As a result, the starter is rotated so that the output shaft of the engine is rotated, whereupon the engine starts. Thereafter, a clutch is released and the starter relay is returned so that the relay switch is turned off. Upon starting of the engine, the generator is driven for power generation, so that the battery is recharged.

In the above-described construction, both engine starter and generator for re-charging the battery are required. The requirement results in an increase in a mounting space of the automobile. Furthermore, a large current flows into the starter in starting the engine in order that a large torque may be developed. Accordingly, the starter relay is required to be large sufficiently to withstand the large current flowing into the starter. Additionally, the clutch is provided to prevent the starter from reverse drive by the engine. The clutch further increases the mounting space of the automobile.

SUMMARY OF THE INVENTION

Therefore, an object of the present invention is to provide a control device for controlling a permanent magnet motor serving as both an engine starter and a generator in a motor vehicle, which control device can reduce the mounting space of the motor vehicle and can eliminate a large starter relay.

The present invention provides a control device for controlling a permanent magnet motor serving as both a starter for an engine and a generator in a motor vehicle, the engine including an output shaft to which the permanent magnet motor is connected, the motor vehicle including a battery. The control device comprises a drive circuit converting a direct current to an alternating current to supply the alternating current to the permanent magnet motor, the drive circuit having at least one arm including two series connected first switching elements having flywheel diodes respectively, the drive circuit having an input terminal connected to a capacitor and an output terminal connected to the permanent magnet motor, a chopper circuit including a plurality of series connected second switching elements having diodes connected in parallel with the second switching elements respectively, the chopper circuit being disposed at the battery side and connected in parallel with the capacitor, a reactor connected between a neutral point of the chopper circuit and the battery, and control means for controlling the switching elements of the drive circuit and chopper circuit so that the switching elements are turned on and off.

In the above-described arrangement, the permanent magnet motor is connected to the output shaft of the engine so as to serve as the starter for the engine. The permanent magnet motor further serves as the generator recharging the battery after starting of the engine. Thus, the single permanent magnet motor is used as the starter and the generator. Consequently, the mounting space of the motor vehicle can be reduced as compared with the conventional construction in which both starter and generator are individually provided. Furthermore, since no clutch is required between the engine output shaft and the permanent magnet motor, the mounting space can further be reduced. Additionally, the permanent magnet motor is driven by the drive circuit controlled by the control means when operated as the starter. Accordingly, no relay switch as a starter relay is required between the battery and the permanent magnet motor. Consequently, a large starter relay is not required.

In a preferred form, when the permanent magnet motor is operated as the starter, the control means renders the chopper circuit non-operative or causes the chopper circuit to operate as a step-up chopper so that the control means controls the drive circuit to drive the permanent magnet motor. When the permanent magnet motor is operated as the generator, the control means renders the drive circuit non-operative and causes the chopper circuit to operate as a step-down chopper so that the battery is recharged, in case voltage generated by the permanent magnet motor is higher than voltage of the battery. In case the voltage generated by the permanent magnet motor is lower than the voltage of the battery, the control means renders the chopper circuit non-operative and turns on and off the negative switching element of the drive circuit so that the drive circuit is caused to operate as a step-up chopper so that the battery is recharged.

In another preferred form, the control device further comprises another chopper circuit connected in parallel with the chopper circuit and including two series connected switching elements having diodes connected in parallel to the switching elements respectively, and another reactor connected between a neutral point of said another chopper circuit and the battery. In further another preferred form, the control means turns on and off the negative switching elements of the two chopper circuits with a timing phase difference by 180 electrical degrees in a case of voltage step-up and turns on and off the positive switching elements of the two chopper circuits with a timing phase difference by 180 electrical degrees in a case of voltage step-down. Additionally, each of the reactors preferably includes a single core and two coils wound on the core.

BRIEF DESCRIPTION OF THE DRAWINGS

Other objects, features and advantages of the present invention will become clear upon reviewing of the following description of preferred embodiments, made with reference to the accompanying drawings, in which:

FIGS. 4A and 4B are on-off waveform charts of transistors;

FIGS. 5A and 5B are on-off waveform charts of the transistors in a phase different from in FIGS. 4A and 4b.

DETAILED DESCRIPTION OF PREFERRED EMBODIMENTS

Figure 1:
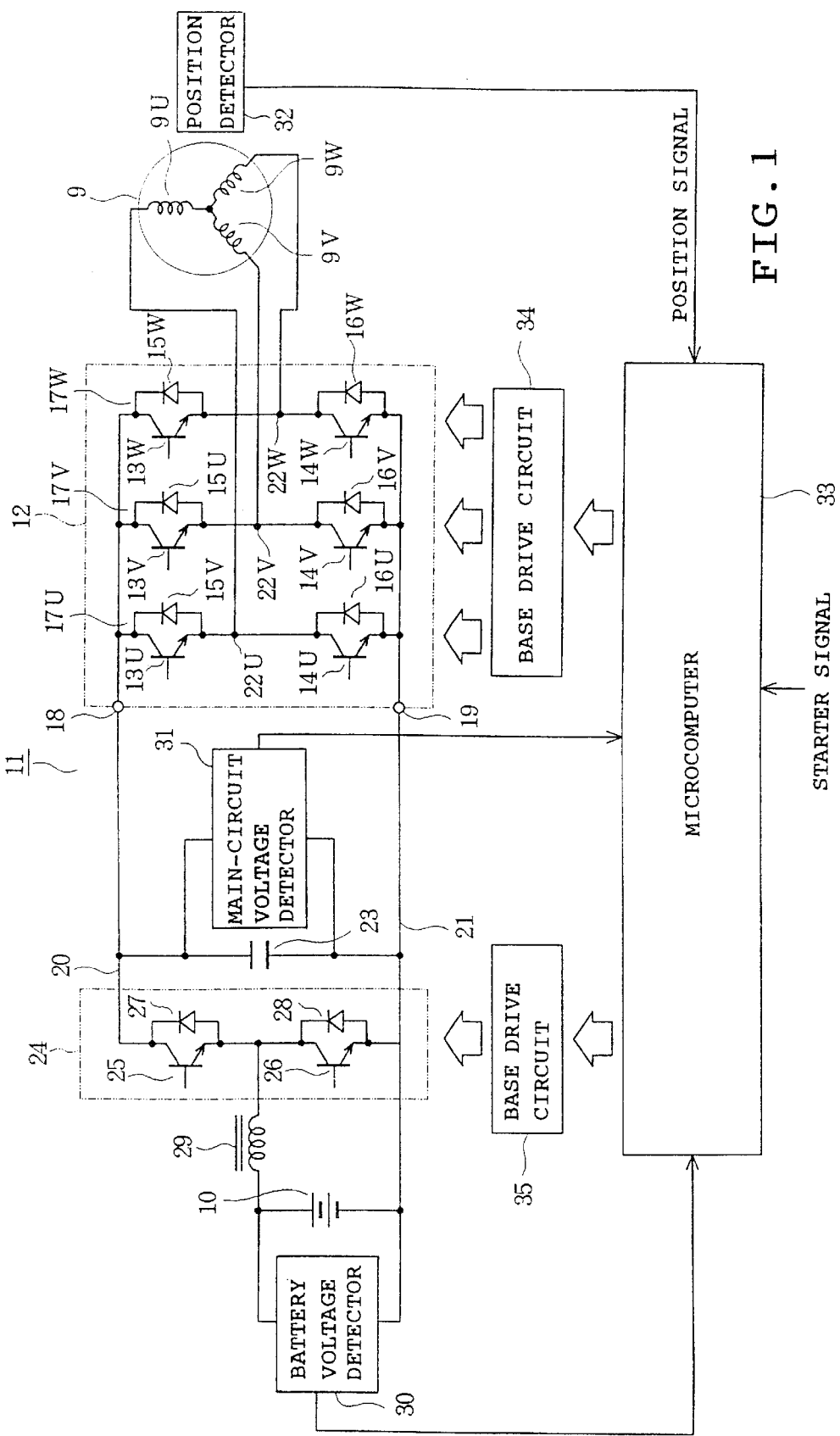
FIG. 1 is a circuit diagram showing an electrical arrangement of a control device of a first embodiment in accordance with the present invention.
Figure 2:
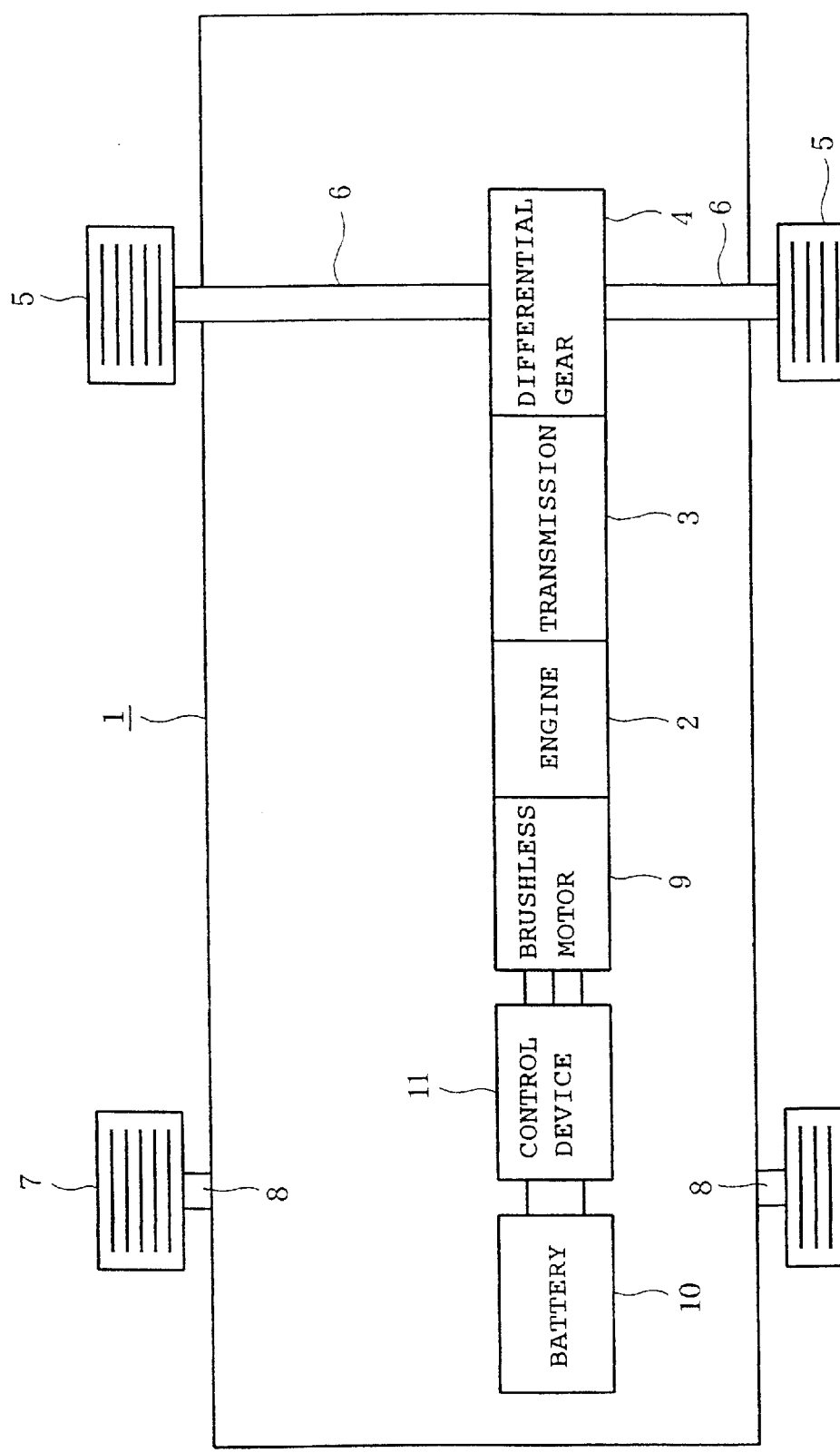
FIG. 2 schematically illustrates an automobile to which the control device is applied.

An embodiment of the present invention will be described with reference to FIGS. 1 and 2. The invention is applied to an automobile in the embodiment. Referring to FIG. 2, an automobile 1 serving as a motor vehicle is schematically shown. An engine 2 is mounted on the automobile 1. Driving force developed by the engine 2 is transmitted through a transmission 3 and a differential gear 4 to axles 6 of rear wheels 5 respectively. Thus the axles 6 of the rear wheels 5 are drive axles, whereas axles 8 of front wheels 7 are driven axles. A permanent magnet motor such as a brushless motor 9 is mounted on the automobile 1. The brushless motor 9 includes a stator having a plurality of, for example, three-phase, stator coils 9U, 9V and 9W and a rotor of the permanent magnet type. The brushless motor 9 further includes a rotor shaft (not shown) connected or more specifically, directly connected to an output shaft of the engine 2. A rechargeable 36-volt battery 10 specified for a hybrid car is also mounted on the automobile 1. The battery 10 comprises a lead storage battery. Electric power from the battery 10 is supplied via a control device 11 to the brushless motor 9 as will be described later.

An electrical arrangement of the control device 11 will now be described with reference to FIG. 1. The control device 11 includes an inverter circuit 12 serving as a drive circuit. The inverter circuit 12 includes six NPN transistors 13U, 13V, 13W, 14U, 14V and 14W serving as switching elements and connected into a three-phase bridge configuration. Flywheel diodes 15U, 15V, 15W, 16U, 16V and 16W are connected across collectors and emitters of the transistors 13U, 13V, 13W, 14U, 14V and 14W respectively. Thus, the inverter circuit 12 has three arms 17U, 17V and 17W. The inverter circuit 12 has input terminals 18 and 19 connected to DC bus bars 20 and 21 respectively. The inverter circuit 12 further has output terminals 22U, 22V and 22W connected to respective one terminals of the stator coils 9U, 9V and 9W of the brushless motor 9. The stator coils 9U, 9V and 9W have the respective other terminals connected together. The DC bus bar 21 is connected to a negative terminal of the battery 10. A capacitor 23 is connected between the dc bus bars 20 and 21.

The control device 11 further includes a chopper circuit 24 comprising two NPN transistors 25 and 26 serving as switching elements and two diodes 27 and 28 connected across collectors and emitters of the transistors respectively. Three or more switching elements may be provided, instead. The collector of the transistor 25 is connected to the DC bus bar 20 and the emitter thereof is connected to the collector of transistor 26. The emitter of the transistor 26 is connected to the DC bus bar 21. A neutral point of the chopper circuit 24 is connected via a reactor 29 to a positive terminal of the battery 10. The reactor 29 comprises a core and a coil wound on the core.

The control device 11 further includes a battery voltage detector 30 connected in parallel with the battery 10 in order to detect a voltage across terminals of the battery. A main-circuit voltage detector 31 is connected in parallel with the capacitor 23 in order to detect a voltage across terminals of the capacitor 23 or main-circuit voltage. A position detector 32 is mounted in the brushless motor 9 and comprises Hall ICs (not shown) detecting a position of the rotor of the brushless motor 9.

The control device 11 further includes a microcomputer 33 serving as control means. The microcomputer 33 has input ports (not shown) to which output terminals of the battery voltage detector 30, main-circuit voltage detector 31 and position detector 32 are connected respectively. The microcomputer 33 further has output terminals (not shown) connected to input terminals of photocoupler type base drive circuits 34 and 35 respectively. A control manner of the microcomputer 33 will be described later. The base drive circuit 34 has output terminals connected to the bases of the transistors 13U, 13V, 13W, 14U, 14V and 14W respectively. The base drive circuit 35 has output terminals connected to the bases of the transistors 25 and 26 of the chopper circuit 24.

The operation of the control device 11 will now be described. Firstly, the case where the brushless motor 9 serves as a starter for the engine 2 will be described. The microcomputer 33 renders the chopper circuit 24 non-operative when the detected voltage between the terminals of the battery 10 is at a rated value. As a result, the DC voltage of the battery is applied via the reactor 29 and the diode 27 to the capacitor 23 so that the capacitor is charged to a value suitable as an input voltage to the inverter circuit 12. Further, the microcomputer 33 supplies a PWM signal to the base of the base drive circuit 35 when the voltage detected across the terminals of the battery 10 is lower than the rated value. As a result, a base signal is supplied to the negative transistor 26 of the chopper circuit 24, so that the transistor 26 is turned on and off according to a duty of the PWM signal.

Current from the battery 10 flows through the reactor 29 and the transistor 26 when the transistor 26 of the chopper circuit 24 is turned on. When the transistor 26 is turned off, electric energy stored in the reactor 29 is discharged via the diode 27 such that raised voltage is applied to the capacitor 23. In this case, a step-up rate of the voltage depends upon the duty of PWM signal. The step-up rate becomes larger as the duty of PWM signal is increased. The microcomputer 33 determines the duty of PWM signal according to the voltage across the terminals of the battery 10. As a result, the capacitor 23 is charged with electricity so that the voltage thereof is suitable for an input voltage of the inverter circuit 12. Thus, the chopper circuit 24 and the reactor 29 serve as a step-up chopper at this time.

When supplied with a starter signal, the microcomputer 33 generates an energization timing signal on the basis of a position signal delivered from the position detector 32, applying the signal to the base drive circuit 34. The base drive circuit 34 then delivers a base signal sequentially to the transistors 13U to 13W and 14U to 14W of the inverter circuit 12, whereby the transistors are sequentially turned on and off. Consequently, an AC current flows into the brushless motor 9 or the stator coils 9U to 9W thereof mounted 120 electrical degrees apart, so that the rotor of the brushless motor 9 starts rotating. Upon starting of the brushless motor 9, the output shaft of the engine 2 connected to the motor shaft is rotated, whereby the engine 2 starts. Accordingly, the brushless motor 9 serves as a starter for the engine 2 in this case.

Secondly, the case where the brushless motor 9 serves as a generator will be described. Upon starting of the engine 2, the microcomputer 33 stops delivery of base drive signals to the transistors 13U to 13W and 14U to 14W of the inverter circuit 12 so that all of these transistors are turned off, whereby the inverter circuit 12 is rendered non-operative. Upon starting of the engine 2, the shaft of the brushless motor 9 or the rotor is rotated by the output shaft of the engine 2 so that voltage is induced in each of the stator coils 9U to 9W. The voltage induced in each stator coil is converted to DC voltage by each corresponding one of the flywheel diodes 15U to 15W and 16U to 16W of the inverter circuit 12 serving as a full-wave rectifier circuit. The brushless motor 9 thus serves as a generator in this case.

The rotational speed of the output shaft of the engine 2 varies according to a degree of press against an accelerator (not shown) of the automobile 1. Accordingly, the voltage induced in each of the stator coils 9U to 9W or generated voltage also varies according to the rotational speed of the output shaft of the engine 2 and the DC voltage applied to the capacitor 23 further varies accordingly. The microcomputer 33 controls the chopper circuit 24 so that the battery 10 is charged at a proper voltage. Firstly, the voltage across the terminals of the capacitor 23 or main circuit voltage is detected by the main-circuit voltage detector 31. When the voltage detected by the main-circuit voltage detector 31 is higher than a rated voltage of the battery 10, namely, the voltage generated by the brushless motor 9 is high, the microcomputer 33 delivers a PWM signal to the base drive circuit 35. As a result, a base signal is applied to the base of the positive transistor 25 of the chopper circuit 24, so that the transistor 25 is turned on and off according to the duty of the PWM signal. In this case, when the transistor 25 of the chopper circuit 24 is turned on, the voltage across the terminals of the capacitor 23 is applied via the reactor 29 to the battery 10 during an on time of the transistor 25. Consequently, the voltage across the terminals of the capacitor 23 is stepped down and then applied to the battery 10. In this case, a step-down rate of the voltage depends upon the duty of PWM signal. The step-down rate becomes larger as the duty of PWM signal is decreased. As a result, the battery 10 is charged with a proper voltage. Thus, the chopper circuit 24 and the reactor 29 serve as a step-down chopper in this case.

On the other hand, when the voltage across the terminals of the capacitor 23 detected by the main-circuit voltage detector 31 is lower than the rated voltage of the battery 10, namely, when the voltage generated by the brushless motor 9 is low, the microcomputer 33 renders the chopper circuit 24 non-operative. Accordingly, the transistors 25 and 26 are not turned on and off, or a repeated on-off operation of the transistors 25 and 26 is not carried out. In the embodiment, the transistor 25 is held in the on state. Further, the microcomputer 33 delivers the PWM signal to the base drive circuit 34 so that the base signal is supplied to the bases of the negative transistors 14U to 14W. As a result, the transistors 14U to 14W are turned on and off according to the duty of PWM signal. In this case, when the inverter circuit 12 is in a pattern that the current is caused to flow out from the stator coil 9U of the brushless motor 9, the transistor 14U is turned on and off. The transistor 14V is turned on and off when the inverter circuit 12 is in a pattern that the current is caused to flow out from the stator coil 9V of the brushless motor 9. The transistor 14W is turned on and off when the inverter circuit 12 is in a pattern that the current is caused to flow out from the stator coil 9W of the brushless motor 9. When the transistor 14U is turned on, the voltage induced in the stator coil 9U, 9V or 9W causes a circulating current to flow through the stator coil 9U, transistor 14 and flywheel diode 16V or 16W, and stator coil 9V or 9W. Consequently, electric energy is stored at the stator coil 9U, 9V or 9W.

When the transistor 14U is turned off, the electric energy stored at the stator coils 9U and 9V or 9W is discharged through the flywheel diode 15U so that the raised voltage is applied to the capacitor 23. In this case, a step-up rate of the voltage depends upon the duty of PWM signal. The step-up rate becomes larger as the duty of PWM signal is increased. The microcomputer 33 determines the duty of PWM signal according to the voltage across the terminals of the battery 10. As a result, the capacitor 23 is charged with a voltage proper for charge of the battery 10. Further, the principle of step-up by turning the transistors 14V and 14W on and off is the same as that by turning the transistor 14U on and off described above. Accordingly, the inverter circuit 12 serves as a step-up chopper with the stator coils 9U to 9W as reactors.

According to the foregoing embodiment, the shaft of the brushless motor 9 is directly connected to the output shaft of the engine 2 so that the brushless motor serves as the starter for the engine 2 at the time of starting of the engine. The brushless motor 9 is further driven by the engine 2 after starting of the latter so as to serve as the generator for charging the battery 10 with electricity. Accordingly, a single brushless motor 9 can serve as both starter for the engine 2 and generator for charging the battery 10. Consequently, the mounting space of the automobile 1 can be reduced as compared with the conventional construction in which both starter and generator are individually provided. Moreover, since no clutch is required between the output shaft of the engine 2 and the shaft of the brushless motor 9, the mounting space of the automobile 1 can further be reduced. When operated as the starter, the brushless motor 9 is driven by the inverter circuit 12 controlled by the microcomputer 33. Consequently, no relay switch such as a conventional large starter relay is required between the battery 10 and the brushless motor 9.

Furthermore, when the voltage across the terminals of the battery 10 is at the rated voltage, the chopper circuit 24 is rendered non-operative and the capacitor 23 is recharged with the voltage across the terminals of the battery. When the voltage across the terminals of the battery 10 is lower than the rated voltage, the chopper circuit 24 and the reactor 29 are operated as the step-up chopper stepping up the voltage across the terminals of the battery 10 to thereby charge the capacitor 23 with the raised voltage.

When the voltage generated by the brushless motor 9 operated as the generator is higher than the rated voltage of the battery 10, the inverter circuit 12 is rendered non-operative and the chopper circuit 24 is operated as the step-down chopper to charge the battery 10 with electric energy. When the voltage generated by the brushless motor 9 is lower than the rated voltage of the battery 10, the chopper circuit 24 is rendered non-operative though the positive transistor 25 is turned on, and the inverter circuit 12 is operated as the step-up chopper together with the stator coils 9U to 9W of the brushless motor 9, so that the battery 10 is recharged.

As the result of the above-described arrangement, even the brushless motor 9 having such a large torque as to be operable as a starter can sufficiently be operated as the generator to recharge the battery 10. Further, even when the voltage of the battery 10 drops, the voltage can be stepped up such that the brushless motor 9 having the large torque can be started.

Figure 3:
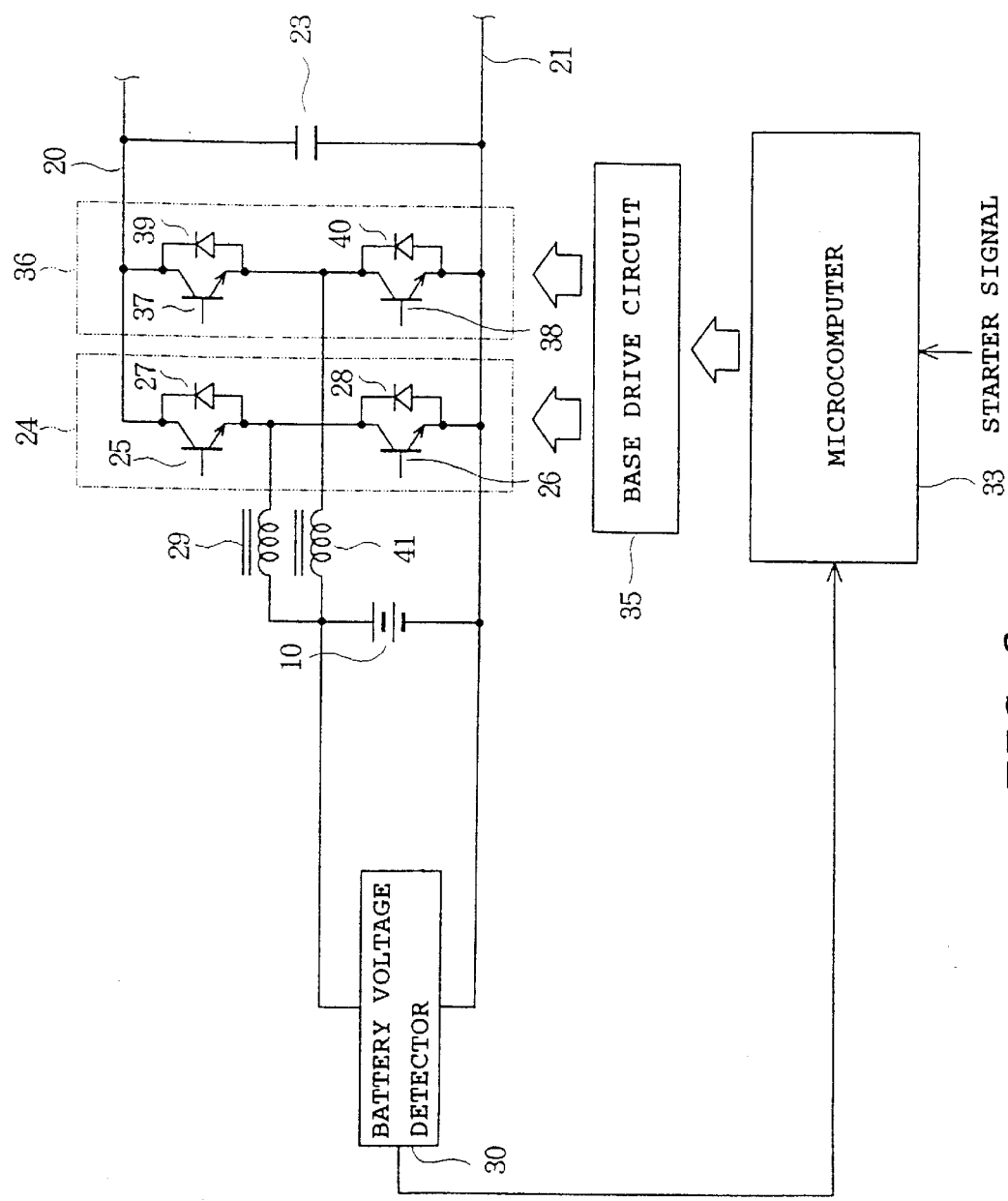
FIG. 3 is a circuit diagram showing part of the electrical arrangement of the control device of a second embodiment in accordance with the invention.

FIGS. 3 to 5 illustrate a second embodiment of the invention. Only the differences between the first and second embodiments will now be described. In the second embodiment, the identical or similar parts are labeled by the same reference symbols as those in the first embodiment. Another chopper circuit 36 connected in parallel with the chopper circuit 24 is provided in the second embodiment.

The second chopper circuit 36 includes two NPN transistors 37 and 38 serving as switching elements, and diodes 39 and 40. The transistor 37 has a collector connected to the DC bus bar 20 and an emitter connected to a collector of the transistor 38. The transistor 38 has an emitter connected to the DC bus bar 21. The diodes 39 and 40 are connected between the collectors and emitters of transistors 37 and 38 respectively. Further, the second chopper circuit 36 has a neutral point connected via a reactor 41 to a positive terminal of the battery 10. Accordingly, the second chopper circuit 36 is connected in parallel with the first chopper circuit 24. Each of the reactors 29 and 41 includes one core and two coils wound on the core.

The operation of the control device in the second embodiment will now be described with reference to FIGS. 3 to 5. Firstly, when the chopper circuits 24 and 36 serve as step-up choppers, the microcomputer 33 drives the base drive circuit 35 which turns the transistors 26 and 38 on and off with a timing phase difference of 180 degrees. In this case, when the step-up rate is to be reduced, on times of the transistors 26 and 38 are rendered shorter than off times of the transistors respectively as shown in FIGS. 4A and 4B. On the other hand, when the step-up rate is to be increased, the on times of the transistors 26 and 38 are rendered longer than the off times of the transistors respectively as shown in FIGS. 5A and 5B.

Further, when the chopper circuits 24 and 36 serve as step-down choppers, the microcomputer 33 drives the base drive circuit 35 which turns the transistors 25 and 37 on and off with a timing phase difference by 180 electrical degrees. In this case, when the step-down rate is to be increased, on times of the transistors 25 and 37 are rendered shorter than off times of the transistors respectively as shown in FIGS. 4A and 4B. On the other hand, when the step-down rate is to be reduced, the on times of the transistors 25 and 37 are rendered longer than the off times of the transistors respectively as shown in FIGS. 5A and 5B.

According to the second embodiment, when the chopper circuits 24 and 36 are operated as the step-up choppers, the microcomputer 33 drives the base drive circuit 35 which turns the transistors 26 and 38 on and off with a timing phase difference by 180 electrical degrees. Consequently, DC power supply voltage with a smaller amount of ripple can be supplied to the capacitor 23. Further, when the chopper circuits 24 and 36 serve as step-down choppers, the microcomputer 33 drives the base drive circuit 35 which turns the transistors 25 and 37 on and off with a timing phase difference by 180 electrical degrees. Consequently, when required to perform a high-speed switching as the step-down choppers, each of the transistors 25 and 37 is required to have only one half responsibility, whereby an amount of generated heat can be reduced. Further, when the transistors 25 and 37 are controlled so that the on times of the transistors are superposed on each other as shown in FIGS. 5A and 5B, the transistors 25 and 37 advantageously share the current.

Figure 6:
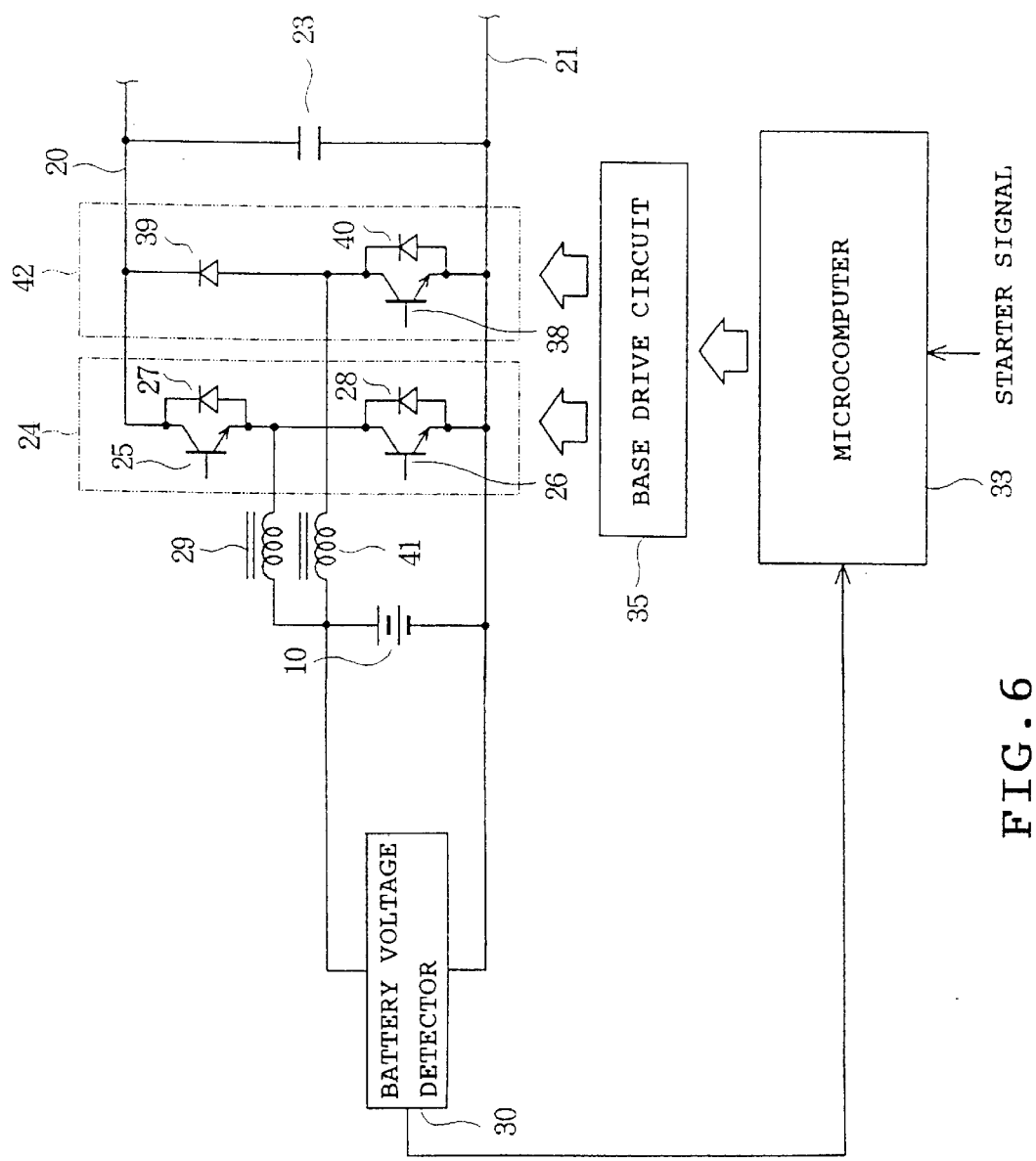
FIG. 6 is a view similar to FIG. 3, showing a third embodiment in accordance with the invention.

Although the second chopper circuit 36 includes the two transistors 37 and 38 in the second embodiment, a chopper circuit 42 in which the transistor 37 in the second embodiment is eliminated may be provided as shown as a third embodiment in FIG. 6, instead. In the third embodiment, only the transistor 25 of the chopper circuit 24 serves as the step-down transistor.

The transistors 25 and 37 of the chopper circuits 24 and 36 may simultaneously be turned on and off in the case of step-down in the second embodiment. Further, although applied to the automobile in the embodiments, the present invention may be applied to all types of the motor vehicles provided with respective engines.

The foregoing description and drawings are merely illustrative of the principles of the present invention and are not to be construed in a limiting sense. Various changes and modifications will become clear to those of ordinary skill in the art. All such changes and modifications are seen to fall within the scope of the invention as defined by the appended claims.

We claim:

1. A control device for controlling a permanent magnet motor serving as both a starter for an engine and a generator in a motor vehicle, the engine including an output shaft to which the permanent magnet motor is connected, the motor vehicle including a battery, the control device comprising:

a drive circuit converting a direct current to an alternating current to supply the alternating current to the permanent magnet motor, the drive circuit having at least one arm including two series connected first switching elements having flywheel diodes respectively, the drive circuit having an input terminal connected to a capacitor and an output terminal connected to the permanent magnet motor;

a chopper circuit including a plurality of series connected second switching elements having diodes connected in parallel with the second switching elements respectively, the chopper circuit being disposed at the battery side and connected in parallel with the capacitor;

a reactor connected between a neutral point of the chopper circuit and the battery; and control means for controlling the switching elements of the drive circuit and chopper circuit so that the switching elements are turned on and off.

2. A control device according to claim 1, wherein when the permanent magnet motor is operated as the starter, the control means renders the chopper circuit non-operative or causes the chopper circuit to operate as a step-up chopper so that the control means controls the drive circuit to drive the permanent magnet motor, and when the permanent magnet motor is operated as the generator, the control means renders the drive circuit non-operative and causes the chopper circuit to operate as a step-down chopper so that the battery is recharged, in case voltage generated by the permanent magnet motor is higher than voltage of the battery, and in case the voltage generated by the permanent magnet motor is lower than the voltage of the battery, the control means renders the chopper circuit non-operative and turns on and off the negative switching element of the drive circuit so that the drive circuit is caused to operate as a step-up chopper so that the battery is recharged.

3. A control device according to claim 1, further comprising:

another chopper circuit connected in parallel with the chopper circuit and including two series connected switching elements having diodes connected in parallel to the switching elements respectively; and another reactor connected between a neutral point of said another chopper circuit and the battery.

4. A control device according to claim 3, wherein the control means turns on and off the negative switching elements of the two chopper circuits with a timing phase difference by 180 electrical degrees in a case of voltage step-up and turns on and off the positive switching elements of the two chopper circuits with a timing phase difference by 180 electrical degrees in a case of voltage step-down.

5. A control device according to claim 3, wherein each of the reactors includes a single core and two coils wound on the core.

6. An automobile comprising:

a battery;

an engine;

a plurality of wheels revolved by the engine;

a starter starting the engine and including a permanent magnet motor;

a control device for controlling the permanent magnet motor, the control device comprising:

a drive circuit converting a direct current to an alternating current to supply the alternating current to the permanent magnet motor, the drive circuit having at least one arm including two series connected first switching elements having flywheel diodes respectively, the drive circuit having an input terminal connected to a capacitor and an output terminal connected to the permanent magnet motor;

a chopper circuit including a plurality of series connected second switching elements having diodes connected in parallel with the second switching elements respectively, the chopper circuit being disposed at the battery side and connected in parallel with the capacitor;

a reactor connected between a neutral point of the chopper circuit and the battery; and control means for controlling the switching elements of the drive circuit and chopper circuit so that the switching elements are turned on and off.

7. An automobile according to claim 6, wherein when the permanent magnet motor is operated as the starter, the control means renders the chopper circuit non-operative or causes the chopper circuit to operate as a step-up chopper so that the control means controls the drive circuit to drive the permanent magnet motor, and when the permanent magnet motor is operated as the generator, the control means renders the drive circuit non-operative and causes the chopper circuit to operate as a step-down chopper so that the battery is recharged, in case voltage generated by the permanent magnet motor is higher than voltage of the battery, and in case the voltage generated by the permanent magnet motor is lower than the voltage of the battery, the control means renders the chopper circuit non-operative and turns on and off the negative switching element of the drive circuit so that the drive circuit is caused to operate as a step-up chopper so that the battery is recharged.

8. An automobile according to claim 6, further comprising:

another chopper circuit connected in parallel with the chopper circuit and including two series connected switching elements having diodes connected in parallel to the switching elements respectively; and another reactor connected between a neutral point of said another chopper circuit and the battery.

9. An automobile according to claim 8, wherein the control means turns on and off the negative switching elements of the two chopper circuits with a timing phase difference of 180 electrical degrees in a case of voltage step-up and turns on and off the positive switching elements of the two chopper circuits with a timing phase difference of 180 electrical degrees in a case of voltage step-down.

10. A motor vehicle according to claim 8, wherein each of the reactors includes a single core and two coils would on the core.

* * * * *